(12) United States Patent
Pfau et al.

(10) Patent No.: US 8,771,581 B2
(45) Date of Patent: Jul. 8, 2014

(54) METHOD OF MAKING ANNEALED DOOR SKINS AND COMPOSITE DOOR ASSEMBLIES, AND RELATED ARTICLES

(75) Inventors: James Pfau, Kirkland, IL (US); James Bryant, Chicago, IL (US); Liqun Xu, Aurora, IL (US); Elizalde Exconde, Bartlett, IL (US)

(73) Assignee: Masonite Corporation, Tampa, FL (US)

( * ) Notice: Subject to any disclaimer, the term of this patent is extended or adjusted under 35 U.S.C. 154(b) by 3 days.

(21) Appl. No.: 13/334,835

(22) Filed: Dec. 22, 2011

(65) Prior Publication Data

US 2012/0159855 A1   Jun. 28, 2012

Related U.S. Application Data

(60) Provisional application No. 61/425,857, filed on Dec. 22, 2010.

(51) Int. Cl.
    *B29B 7/00*   (2006.01)
(52) U.S. Cl.
    USPC ......................................................... 264/349
(58) Field of Classification Search
    USPC ......................................................... 264/349
    See application file for complete search history.

(56) References Cited

U.S. PATENT DOCUMENTS

| | | | |
|---|---|---|---|
| 2,451,597 A * | 10/1948 | Wheeler ..................... 156/247 |
| 4,721,643 A | 1/1988 | Harayama et al. |
| 5,211,902 A | 5/1993 | Unger et al. |
| 5,869,814 A | 2/1999 | Scoles |
| 5,932,314 A | 8/1999 | West |
| 6,205,728 B1 | 3/2001 | Sutelan |
| 6,226,958 B1 | 5/2001 | West et al. |
| 6,309,503 B1 | 10/2001 | Martino |
| 6,401,414 B1 | 6/2002 | Steel et al. |
| 6,743,327 B2 | 6/2004 | Schober |
| 6,759,114 B2 | 7/2004 | Wu et al. |
| 2003/0175488 A1 * | 9/2003 | Asthana et al. ............... 428/212 |
| 2007/0082997 A1 | 4/2007 | Pfau et al. |
| 2008/0016819 A1 | 1/2008 | Xu et al. |

\* cited by examiner

*Primary Examiner* — Joseph S Del Sole
*Assistant Examiner* — John Robitaille
(74) *Attorney, Agent, or Firm* — Berenato & White, LLC

(57) ABSTRACT

A method is provided for making an annealed door skin or composite door assembly. At least the door skin is formed of a composition comprising a thermoset binder and fiberglass. The door skin, alone or in combination with other parts of a door assembly, is subjected to annealing to make the annealed door skin. The process of annealing comprises the step of heating the door skin, alone or in combination with other parts of the door assembly, above the glass transition temperature yet below the thermal degradation temperature of the thermoset binder for a sufficient amount of time to cause release internal stresses in the door skin, then the step of cooling the door skin.

26 Claims, 4 Drawing Sheets

METHOD OF MAKING ANNEALED DOOR SKINS AND COMPOSITE DOOR ASSEMBLIES, AND RELATED ARTICLES

CROSS-REFERENCE TO RELATED APPLICATION

This application claims the benefit of U.S. Provisional Patent Application Ser. No. 61/425,857 filed Dec. 22, 2010 by Pfau et al., which is hereby incorporated herein by reference in its entirety and to which priority is claimed.

FIELD OF THE INVENTION

The invention relates to a method of annealing fiberglass-reinforced thermosetting articles, especially door skins and composite door assemblies. The invention further relates to articles such as door skins and composite door assemblies.

BACKGROUND OF THE INVENTION

Doors are increasingly being manufactured from composite components containing fiberglass and thermoset polymers. Typical composite door assemblies include a pair of compression molded exterior skins (also referred to herein and generally known as "facings"). The door skins are mounted on a rectangular usually interior frame, frequently formed of wood, that separates and supports the skins in spaced relationship to one another. A hollow space between the skins and bounded by the door frame typically is filled with an insulating material, for example, cardboard, paper, fiberboard, or foam such as polyurethane.

Composite door assemblies provide several advantages over natural and steel doors. Composite door assemblies resist rot and corrosion experienced with solid wood and metal doors, respectively. The composite door assemblies also generally are better insulators than solid wood and metal doors. Because of material costs and manufacturing efficiencies, polymer composite door assemblies are considerably less expensive to manufacture than solid wood doors and can be designed to provide a reasonable facsimile of a wood grain on their outer surfaces.

A typical compression molding process used for making commercially available molded door skins involves placing a predetermined weight of sheet molding compound (SMC) charge layers containing a thermosetting polymeric material and fiberglass reinforcement on a lower mold half. An upper mold half is then advanced into engagement with the lower mold half to force the SMC material to fill and to conform to the shape of the mold cavity during compression. The mold halves are heated to a processing temperature, for example about 150° C., to facilitate flow of the resin and cause the thermosetting reaction, also known as curing. Once solidified, the molded door skins are removed from the mold press. Often, the mold dies have contours and embossing features that imprint depressions, grooves, patterns, texture and the like into the molded door skin. The imprinted features often are configured as one or more square or rectangular depressions simulating the perimeter of one or more panels. Alternatively, the facings may be flush. The design flexibility makes composite door assemblies useful for residential and commercial buildings, as well as other uses.

Typically, sheet molding compounds contain a thermosetting resin system such as an unsaturated polyester resin and an unsaturated co-curable reactive monomer, such as styrene. The sheet molding compounds also contain a reinforcing agent, such as glass fibers, often presented as chopped fiberglass and/or a thin fiber mat. Additives commonly combined with sheet molding compounds include catalysts, activating agents, thickening agents, stabilizers, and inert fillers such as calcium carbonate, talc, and wood particles.

The use of conventional compression molded door skins in geographical areas having high or low temperature seasonal climates can be problematic. For example, in areas such as in the northern United States and Canada, low winter temperatures can create a high thermal gradient between, on the one hand, the outside door skin exposed to environmental conditions and, on the other hand, the inside door skin warmed by the internal heating of its associated house or building. This temperature gradient can cause the door skins, particularly the outer door skin, to temporarily or permanently bow or warp. While warping and bowing distances smaller than ¼ inch may be tolerable, greater bowing of the door can violate building codes, blight the door's aesthetic appearance, and impair functionality of the door. For example, a warped door may be difficult to close in a sealing manner with respect to its exterior door frame, to which the doors is pivotally attached, usually by hinges.

One conventional solution for reducing bowing is to reinforce the frame of the composite door with steel rods or the like. In theory, the steel rods incorporated into the interior door frame should possess sufficient strength and stiffness to negate warping forces of the skin secured to the door frame. However, in practice it has been found that the steel rods do not prevent unacceptable bowing in extreme temperature climates. Further, steel reinforcement adds to the overall cost and weight of the door, making it more expensive and laborious to ship and install the door.

SUMMARY OF THE INVENTION

In accordance with a first aspect of the invention, a method of making an annealed door skin is provided. According to this method, a door skin formed of a composition containing at least a thermoset binder and fiberglass is subjected to annealing to anneal door skin. Annealing involves heating the door skin above the glass transition temperature yet below the thermal degradation temperature of the thermoset binder for a sufficient amount of time to cause release of internal stresses in the door skin, and thereafter cooling the door skin.

According to a second aspect of the invention, a method is provided of making an annealed composite door. According to the method of this aspect, the composite door featuring an interior door frame and first and second door skins on opposite sides of the door frame is subject to annealing to anneal the composite door. The annealing involves heating the door above the glass transition temperature yet below the thermal degradation temperature of a thermoset binder of at least one of the door skins, which is made of a composition containing at least the thermoset binder and fiberglass. The heat is applied for a sufficient amount of time to cause release of internal stresses in the door skin, and thereafter the composite door is cooled.

Other aspects of the invention, including assemblies, devices, systems, methods, apparatus, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S) AND EXEMPLARY METHOD(S)

Figure 1:
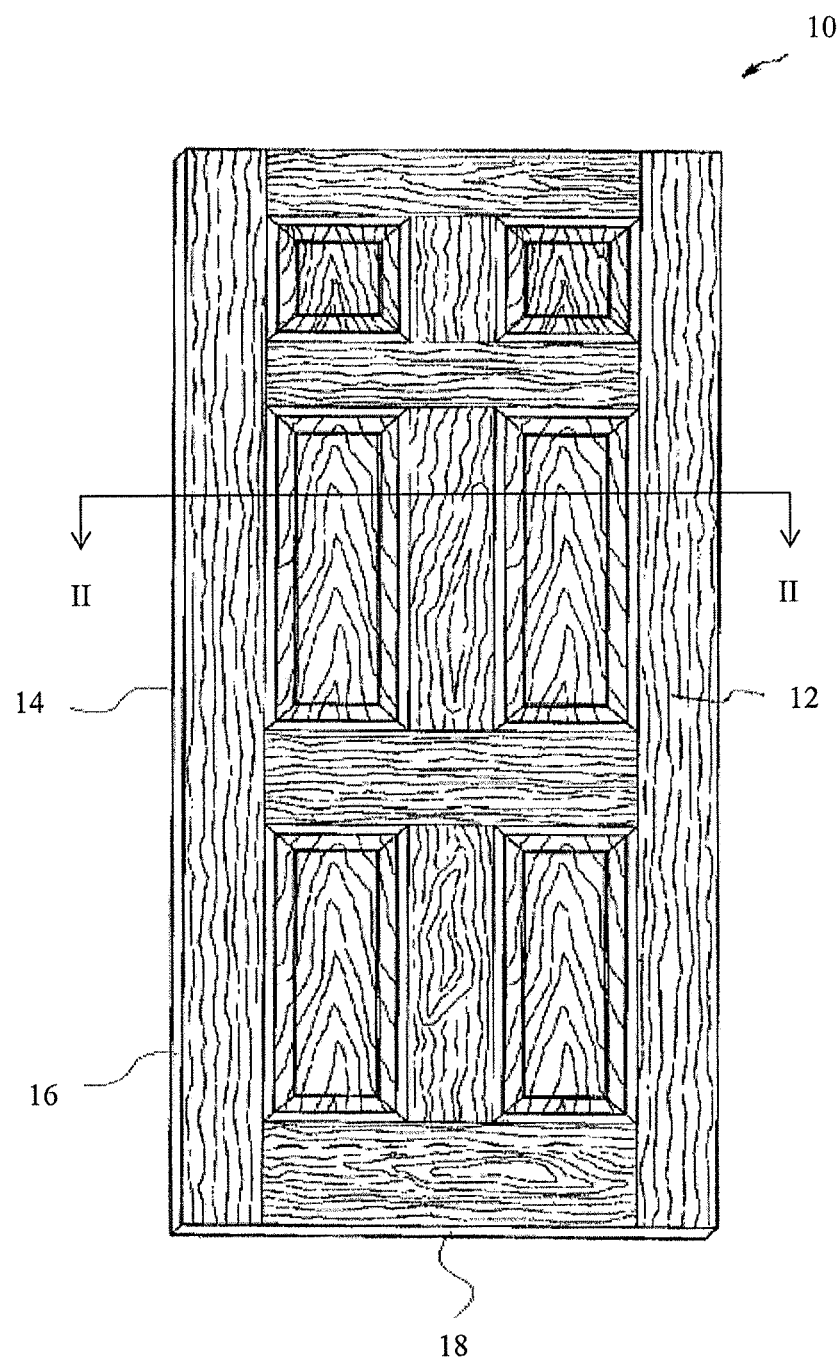
FIG. 1 is perspective view of a composite door assembly according to an embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods. For example, a process is described below in connection with fiberglass reinforced polymer (FRP) doors and door skins formed of a composition comprising a thermoset binder in the form of a thermoset composition which is cured into the thermoset binder, and fiberglass held together by the thermoset binder. However, the process may be used on a variety of articles, particularly panels and other building components.

Figure 2:
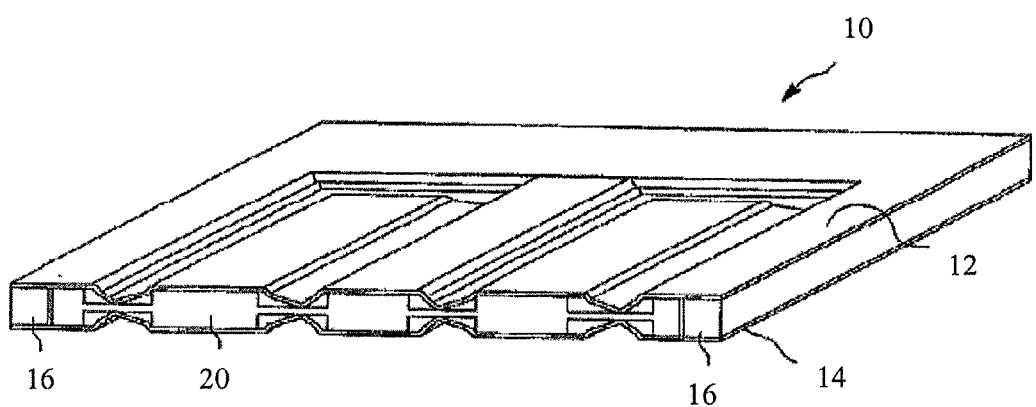
FIG. 2 is a sectional, perspective view of the composite door assembly of FIG. 1 taken along sectional line II-II of FIG. 1.

As best shown in FIGS. 1 and 2, a composite door assembly 10 has a multi-panel outer door skin (also referred to herein as facing) 12 and an inner door skin 14. The outer and inner door skins 12, 14 are substantially parallel to and spaced apart from one another. Although the door skins 12, 14 are shown as six-panel substantially rectangular door panels, it should be understood that the door skins may possess single-panel or alternative multi-panel designs, different shapes and configurations, and other appearances. Alternatively, the door skins 12, 14 may have the appearance of a flush door skin with no internal panels. The door skins 12 and 14 may possess identical or different compositions, and may possess the same or difference appearance as one another.

The composite door assembly 10 may be an exterior entryway door or an interior passageway door of a building, such as a dwelling or commercial property. In view of the excellent thermal stability of the door skins and door assemblies described herein, use of the door assembly 10 as an exterior door is particularly advantageous. Exterior and passageway doors typically have a height of about 6 foot, 8 inches to about 9 feet, more usually about 8 feet, and a width of about 3 to 4 feet, with 3 foot 6 inches being standard width for many passageway doors. Other uses of the composite door assembly 10 include furniture (e.g., cabinet, desk) drawers, furniture doors, and closet doors. Although not shown in the drawings, the composite door assembly 10 may include hardware, such as a handle, knob, or other grasping mechanism, with or without a locking mechanism. Although not shown, openings may be provided in the door skins 12, 14 for receiving door lights (or "lites") and other door components. The composite door assembly 10 may further include appropriate mounting hardware for its intended use, such as hinges for mounting the composite door assembly 10 to a wall structure (e.g., the frame of a door passageway) or guide rails for allowing sliding movement of the composite door assembly 10. While the embodiments described herein relate primarily to door skins and composite door structures, it should be understood that the disclosed invention is applicable for other composite panels.

Interior surfaces of the door skins 12, 14 are secured to opposite sides of an interior door frame using adhesive, fasteners, other conventional fastening devices and techniques, or a combination thereof. Although not particularly limited, the door frame is typically made of wood but sometimes is made of composite materials, man-made pressed wood, metals, or a combination of these and/or other materials. The door frame includes vertical members known as stiles 16 positioned at opposite sides of the door 10 and extending vertically along substantially the entire length of the door 10. The frame further includes horizontal members known as rails 18 positioned at opposite (top and bottom) ends of the door 10 and extending horizontally along substantially the entire width of the door 10. The stiles 16 and rails 18 collectively establish the periphery of the door 10 in the illustrated embodiment. Although not show, the frame may include intermediate stiles and rails hidden from view between the door skins 12, 14.

The exterior surfaces of the door skins 12, 14 may be smooth or textured, or a combination thereof. The texture may simulate that of a wood grain design as shown in FIG. 1, or other design. The coloration of the door skins 12, 14 is often a wood toned color, although any base coloration may be used. Stain, paint, or other dye may be applied to the door skins 12, 14, as may print ink grain designs and the like. Alternatively, an image can be printed on the exterior surfaces of the door skins 12, 14, as described in U.S. Pat. No. 7,001, 016. The aesthetic appearance and tactile feel of the door skins 12, 14 may be substantially identical to or different from one another. The exterior surfaces of the door skins 12, 14 optionally may be sealed. Optionally, a veneer may be bonded to the exterior surfaces to provide a desired appearance (e.g., color, grain and/or inlay patterns of natural wood).

A core component 20 is optionally situated between the outer and inner door skins 12, 14. As referred to herein, the term "composite door assembly" encompasses within its meaning a door shell (i.e., the frame and door facings 12, 14) with or without the core component 20. The core component 20 may comprise a foam formed of any suitable polymer material which can be injected and formed in place (in situ) between the door skins 12, 14 and the frame 28, or can be pre-formed and then placed in the frame 28 prior to attachment of one or both of the door skins 12, 14 to the frame 28. Non-foam materials that may be used include, for example, corrugated pads and other insulation and materials. It should be noted that the interior surfaces of the door skins 12, 14 may be adhered to the core component 20, if present. Optionally, the door assembly 10 may exclude a core, e.g., to provide an empty hollow area between the door skins 12, 14.

The door skins 12, 14 may be made of various resins systems and additives compatible with the present invention, including those materials commonly employed in the door-fabrication industry. According to an exemplary embodiment, the door skins 12, 14 are made of a thermosetting resin composition (or thermoset composition cured into a thermoset binder holding together fiberglass), preferably a sheet molding compound (SMC) or bulk molding compound (BMC) composition. The thermosetting composition preferably contains at least one unsaturated polyester resin and at least one unsaturated, co-curable crosslinking monomer such as styrene that is reactive with the polyester. The unsaturated polyester resin may comprise a polycondensation reaction product of one or more dihydric alcohols and one or more unsaturated polycarboxylic acids. A heat-activated catalyst may be included in the composition. Another example of a suitable thermosetting resin is a polyurethane resin, such as a urethane sheet molding compound, which may comprise, for example, a urethane polymer or prepolymer, a crosslinker and/or linking agent, such as a di- or polyisocyanate, and a catalyst. Other thermosetting resin systems can be used in addition to or as alternatives for the unsaturated polyester, such as phenolic resins, vinyl ester resins, and epoxy resins. Additionally, the resin component of the composition may include one or more thermoplastic polymers, for example, polyolefins such as polyethylene, polypropylene, polystyrene, acrylonitrile-butadiene-styrene (ABS), acrylate-styrene-acrylonitrile (ASA), and others.

The composition may include low shrinkage and low profile additives, organic initiators (e.g., tertiary-butyl peroxybenzoate), thickening agents (e.g., oxides, hydroxides, and alcolates of magnesium, calcium, aluminum), stabilizers or inhibitors, fillers, reinforcements, nanocomponents (see U.S. Pat. Appln. Pub. No. 2008/0016819 to Xu et al., "Nanocomposite door facings, and related door assemblies and methods", the disclosure of which is incorporated herein by reference), and other additives. Examples of low profile additives include thermoplastic polymers, such as saturated polyesters, polystyrene, polyvinyl acetate, and copolymers and terpolymers of the same. Other low profile additives known in the art may also be included.

The fiberglass may be either treated or untreated. The fibers may have a length in a range of, for example, about 3 mm to about 7.62 cm (about 3.0 inches). The glass may be blended into the composition, and chopped into fibers of variable length during an extrusion process. Alternatively, the fibers may have a substantially uniform length. Pre-chopped glass fibers having a particular length may also be used. The chopped fibers may be mixed into the composition during blending. Fiberglass is often found in many commercial sheet molding compounds, and often is present as 1 inch or half inch chopped fiberglass.

Fillers and reinforcements may be incorporated to serve various purposes, including extending the resin, improving mold flow, and/or imparting desired characteristics and mechanical properties to the finished product. Examples of other fillers that may be included in the composition are calcium carbonate, clay, graphite, magnesium carbonate, talc, and mica, including muscovite mica or phlogopite mica. It is often desirable from a cost-savings standpoint to incorporate at least as much mica as fiberglass into the composition.

Additional examples of fillers and reinforcements include graphite, aramids, and organic fibrous additives, in particular cellulosic materials. Suitable organic fibrous additives include wood powder or wood flour, such as provided by relatively small particles of pine and other suitable inexpensive woods, such as oak, cherry, maple, gum and combinations of the same or other woods. Other fibrous organic materials may also be used, including but not limited to straw, rice husks, and knaff. The organic fibrous additive component may comprise a mixture of wood and other fibrous organic materials. The additive may be sized to pass through an 80 mesh sieve, although different sizes may be used. The organic fibrous material may be a by-product of other wood manufacturing processes. For example, the organic fibrous material may be considered to be part of the waste stream of a manufacturing facility. Use of waste material has significant cost and environmental benefits. The filler and reinforcement materials may take various physical shapes, such as fibrous, microspheres, or one or more mats.

The SMC composition may be embodied to constitute, for example, about 15 to about 25 weight percent of the thermosetting resin composition, about 10 to about 20 weight percent low profile additive, about 13 to about 20 weight percent reinforcement, and about 30 to about 50 weight percent filler, and optionally other ingredients, such as, for example, mold release agents, shelf inhibitors, wetting agents, homogenizers, UV retardants, pigments, fire retardants, thickening agents, antioxidants, antistatic metals, colorants, and other additives and fillers described above. Concentrations may be adjusted as warranted for obtaining desired properties.

Any suitable molding technique may be employed for compressing and shaping door skins 12, 14, including, for example, compression molding, resin transfer molding, injection compression molding, thermoforming, and injection molding. Generally, compression molding involves introducing the pre-blend and/or unblended components onto a lower die, the moving one or both dies towards the other to form a closed cavity. The dies may possess embossing structures and texture designed to transfer embossments and grain to the molded door, as is known in the art. During pressing, the components are pressed together between the upper and lower dies and shaped by application of heat and pressure. Sheet molding compounds are often pressed within a temperature range of about 135° C. (275° F.) to about 177° C. (350° F.), more preferably about 138° C. (280° F.) to about 160° C. (320° F.). The dies exert a pressure on the composition of, for example, about 1000 to about 2000 psi. The pressing operation often lasts, for example, about 30 seconds to 2 minutes.

Thermosets can develop high internal stresses during compression molding. The internal stress can result from cooling variants in different areas of the molded door skin. For example, one surface of the door skin may cool faster and create a stiff outer area. The stiff outer area can limit the shrinkage of the unsolidified interior material. This results in tensile stresses in the outer area and compressive stresses in the core.

According to exemplary embodiments, the internal stresses generated during formation of the thermoset door skin can be alleviated by subjecting the thermoset door skin to a post-forming, annealing process.

According to an exemplary annealing process depicted in flowchart form in FIG. 3, the compression-molded door skin is heated from room temperature to a temperature that is above the glass transition temperature yet below the thermal degradation temperature of the thermoset binder. The heating may take place in a standard oven used in the art. The oven may be preheated to an initial annealing temperature as depicted by reference numeral 22 in FIG. 3. Alternatively, the oven may be subject to initial heating after the door skin is introduced into the oven.

Figure 3:
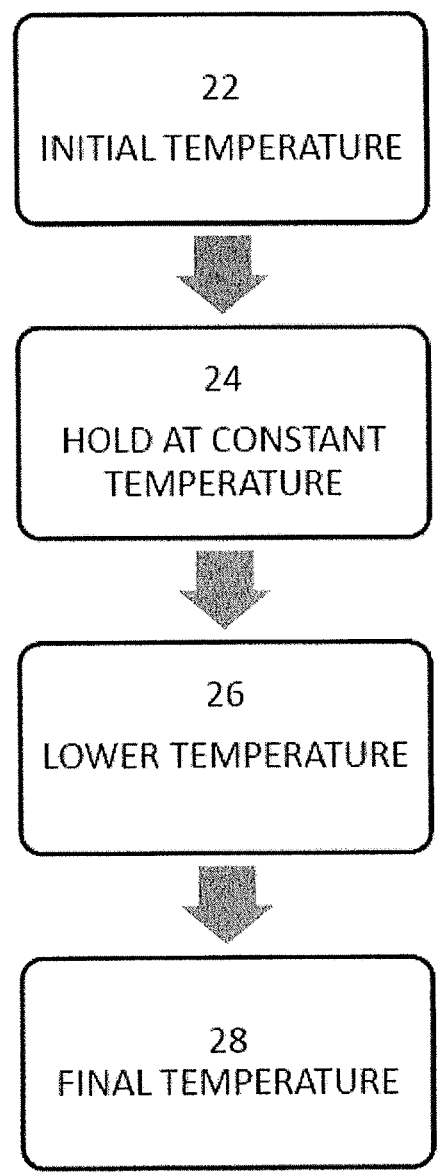
FIG. 3 is a flowchart of an annealing and cooling process according to an embodiment of the invention.

The annealing step may involve holding the oven at a substantially constant temperature as depicted by reference numeral 24 in FIG. 3. The temperature is desirably maintained within a range of plus or minus (±) 10° F. from a selected annealing temperature. Alternatively, the temperature of the oven may be fluctuated during heating, although in exemplary embodiments the temperature is held between the glass transition temperature and thermal degradation temperature of the thermoset composition. It has been found that temperatures around 180° F.-220° F. (about 82° C. to about 104° C.), such as 200° F. (about 93° C.), generally fall within this range. However, the glass transition temperature (Tg) and thermal degradation temperature will vary depending upon the particular composition of the door skin.

Heating at the annealing temperature is carried out for a sufficient amount of time so that, upon cooling of the door skin to ambient temperature (discussed below), internal stress in the door skin is at least partially relieved. That is, after annealing and subsequent cooling, the door skin preferably possesses a lower internal stress than a comparable door skin of identical composition and size that has not been subjected to annealing. Generally, annealing times of greater than 24 hours, even greater than 48 hours, have been found exemplary. Annealing times of 60 hours at 200° F. (about 93° C.) have been found useful. Stress relief in the door skins is affected by the combination of annealing temperature and annealing time. Generally, as the annealing temperature is increased, the amount of annealing time needed to achieve a given amount of stress relief is reduced, and vice versa, i.e., as the annealing temperature is decreased, the amount of annealing time needed to achieve a given amount of stress relief is increased.

Because the annealing times are relatively long when compared to the compression molding (or other forming) step, which as described above may be less than 2 minutes, it is preferred from a throughput standpoint to anneal multiple door skins in the same oven simultaneously. Annealing of multiple door skins may be conducted in a continuous operation (passing the door skins through an oven in an inline process) or a batch operation. The door skins may be set on their upper or lower ends, perpendicular to the ground, during the prolonged annealing step in order to avoid flexing and sagging of the door skins. The door skins may be spaced from one another during annealing to improve uniformity of heating of both surfaces of each door skin.

Returning to FIG. 3, after the door skins have been annealed in step 24, the door skins are cooled gradually in step 26. Controlled cooling at a moderate cooling rate prevents the alleviated stresses from redeveloping in the door skins. Cooling rates of 50° F. or less per hour, such as about 25° F. or less per hour or 15° F. or less per hour, may be useful. Temperature reduction may be continuous or may be performed stepwise. For example, in an embodiment described herein temperature is reduced stepwise at 15° F. per hour.

It is not necessary to carry out the controlled temperature reduction step 26 to ambient temperature. Once a suitable final temperature is reached in step 28, the door skins may be cooled at an accelerated rate, such as by placing the door skins into an ambient environment. In an exemplary embodiment, the final temperature of step 28 is about 125° F. (about 52° C.), though various other temperatures may be chosen.

It should be noted that various modification and variations to the above described exemplary embodiments may be practiced. It is desirable, however, that the method as modified or varied have the effect of reducing internal stresses in the door skins to the point that the door skins are not subject to more than about 0.25 inch bowing during extended use.

According to another exemplary embodiment, the above-discussed embodiments may be modified or varied by subjecting the composite door assembly to the annealing and controlled cooling process to relieve stresses in door skins already secured to an interior door frame. In this modified embodiment, a door skin is secured to one side of a door frame or first and second door skins are secured to opposite sides of a door frame before annealing. The composite door assembly 10, including the door frame, is then subjected to the procedure outlined in FIG. 3. The core component 20 may be incorporated into the composite door assembly 10 prior to the annealing sequence of FIG. 3. Alternatively, the composite door assembly 10 without the core component (also known as a door shell) may be subjected to annealing and controlled cooling, and the core component 20 may be inserted into the door shell thereafter.

EXAMPLES

The following examples are provided by way of explanation and are not to be considered exhaustive or exclusive of the scope of exemplary embodiments.

Example 1

An oven was preheated to 200° F. (about 93° C.) over a one hour period (t=1 hr), and six-panel, thermoset door skins formed from sheet molding compound were placed in the oven and heated at 200° F. (about 93° C.) for 48 hours. After 48 hours, the oven temperature was reduced 15° F. to 185° F. (85° C.) (at t=0). In hourly increments, the oven temperature was repeatedly lowered 15° F. and held for an hour, i.e., to 170° F. (about 77° C.) for t=1-2 hours; 155° F. (about 68° C.) at t=2-3 hours; 140° F. (60° C.) at t=3-4 hours; to 125° F. (about 52° C.) for t=4-5 hours. After five hours of cooling, the door skins were removed from the oven and placed in ambient conditions.

Example 2

The procedures of Example Set 1 were repeated, except that a door shell, i.e., a composite door assembly without a foam core component, including the six-panel thermoset door skins on opposite sides of a door frame was subjected to the annealing process.

Example 3

The procedures of Example Set 1 were repeated, except that a composite door assembly including six-panel thermoset door skins on opposite sides of a frame and a foam core component was subjected to the annealing process.

Comparative Example A

Doors otherwise identical to those of Example Set 3, but not subjected to the annealing and controlled cooling steps, were selected and tested as discussed below.

Testing Procedures for Deflection Data

Testing of exemplary doors and door skins and comparative door skins for deflection or bowing was carried out as follows.

1. Screw hinges into the mortised areas on the hinge side of the door.

2. Install deadbolt and doorknob onto door.

3. Align door with hinges already installed on the door frame opposite of infrared (IR) heaters. Install hinge pins to attach door to frame.

4. Close door and lock door into the frame with the deadbolt and doorknob lock.

5. Check deflection sensors on the back side of door (i.e., the side opposite of the IR heaters) to ensure contact with door. Contact locations are (i) top corner on lock side of door; (ii) middle of door; and (iii) bottom corner on lock side of door.

6. Reset the deflection sensors to 0.0".

7. Run standard heat wall program as follows: For the first cycle, ramp the temperature up to 180° F. (about 82° C.) in 45 minutes, hold at 180° F. (about 82° C.) for 2 hours, then ramp temperature down to room temperature over a 15 minute period. Repeat the cycle four times for approximately 12 hours of heat cycling, then let cool to room temperature overnight. The cycles were then repeated for four more days.

8. Read the deflection sensors constantly to determine the distance the door has moved during heating and cooling cycles.

9. Record the maximum deflection read by the deflection sensors at the end of the fourth cycle (once heating has completed) for each day.

Figure 4:
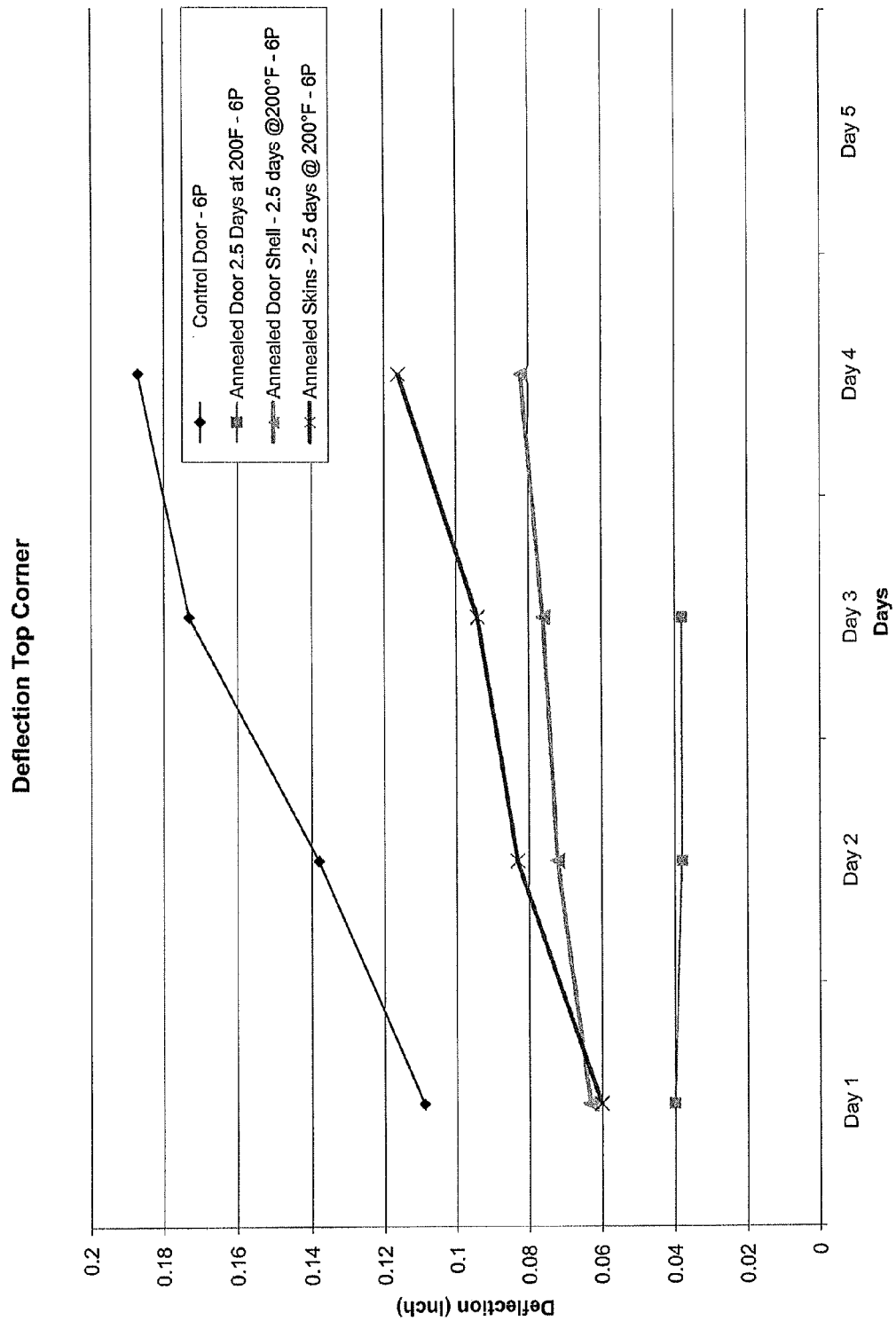
FIG. 4 is a graph plotting deflection data of annealed door articles and, for comparison, a door which was not subject to annealing.

The maximum deflection per day for exemplary doors and door skins and comparative door skins are plotted in FIG. 4. The exemplary doors and door skins included six-panel door skins annealed for 2.5 days at 200° F. (about 93° C.). The comparative example was a six-panel door skin not subjected to annealing. As shown in FIG. 4, the exemplary annealed door maintained a relatively small deflection of about 0.04 inch over three days of testing. In contrast, the comparative door which was not subjected to annealing had a deflection that rose from about 0.11 inch on day 1 to about 0.14 inch on day 2 to about 0.17 on day 3. Thus, the exemplary annealed door experienced much less bowing that the comparative non-annealed door.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

Only those claims which use the words "means for" are to be interpreted under 35 USC 112, sixth paragraph. Moreover, no limitations from the specification are to be read into any claims, unless those limitations are expressly included in the claims.

What is claimed is:

1. A method for making an annealed door skin, comprising:
   annealing a door skin comprising a thermoset binder and fiberglass to make an annealed door skin, said annealing comprising
      heating the door skin above the glass transition temperature yet below the thermal degradation temperature of the thermoset binder for a sufficient amount of time to release of internal stresses in the door skin; and
      cooling the door skin.

2. The method as defined in claim 1, wherein said heating is conducted at or above about 200° F.

3. The method as defined in claim 1, wherein the sufficient amount of time is at least 24 hours.

4. The method as defined in claim 1, wherein the sufficient amount of time is at least 48 hours.

5. The method as defined in claim 1, wherein said cooling comprises cooling the door skin at a rate of about 50° F. or less per hour.

6. The method as defined in claim 1, wherein said cooling comprises cooling the door skin at a rate of about 25° F. or less per hour.

7. The method as defined in claim 1, wherein said cooling comprises cooling the door skin at a rate of about 15° F. per hour.

8. The method as defined in claim 1, wherein said cooling comprises cooling the door skin to about 125° F. at a rate of about 15° F. per hour.

9. The method as defined in claim 1, wherein said heating is conducted at or above about 180° F. for at least 48 hours, and wherein said cooling comprises cooling the door skin at a rate of about 50° F. or less per hour.

10. A method for making an annealed composite door, comprising:
    annealing a composite door comprising a door frame and first and second door skins on opposite sides of the door frame to make an annealed composite door, at least the first door skin comprising a thermoset binder and fiberglass, said annealing comprising
       heating the composite door above the glass transition temperature yet below the thermal degradation temperature of the thermoset binder for a sufficient amount of time to cause release internal stresses in the door skin; and
       cooling the composite door.

11. The method as defined in claim 10, wherein said heating is conducted at or above about 200° F.

12. The method as defined in claim 10, wherein the sufficient amount of time is at least 24 hours.

13. The method as defined in claim 10, wherein the sufficient amount of time is at least 48 hours.

14. The method as defined in claim 10, wherein said cooling comprises cooling the door skin at a rate of about 50° F. or less per hour.

15. The method as defined in claim 10, wherein said cooling comprises cooling the door skin at a rate of about 15° F. per hour.

16. The method as defined in claim 10, wherein said heating is conducted at or above about 200° F. for at least 24 hours, and wherein said cooling comprises cooling the door skin at a rate of about 50° F. or less per hour.

17. The method as defined in claim 10, wherein said heating is conducted at or above about 180° F. for at least 48 hours, and wherein said cooling comprises cooling the door skin at a rate of about 50° F. or less per hour.

18. The method as defined in claim 1, wherein said heating is conducted at or above about 200° F. for at least 24 hours, and wherein said cooling comprises cooling the door skin at a rate of about 50° F. or less per hour.

19. A method for making an annealed composite door, comprising:
    annealing a composite door comprising a door frame and first and second door skins on opposite sides of the door frame to make an annealed composite door, at least the first door skin comprising a thermoset binder and fiberglass, said annealing comprising
       heating the composite door in a range of 180-220° F. for at least 24 hours; and
       cooling the composite door at a rate of about 50° F. or less per hour.

20. The method as defined in claim 19, wherein said heating is maintained for at least 48 hours.

21. The method as defined in claim 19, wherein said cooling comprises cooling the first door skin at a rate of about 25° F. or less per hour.

22. The method as defined in claim 19, wherein said cooling comprises cooling the first door skin at a rate of about 15° F. or less per hour.

23. The method as defined in claim 19, wherein said cooling comprises cooling the first door skin to about 125° F. at a rate of about 15° F. per hour.

24. The method as defined in claim 1, wherein the door skin is a door skin of a residential or commercial building.

25. The method as defined in claim 10, wherein the door skin is a door skin of a residential or commercial building.

26. The method as defined in claim 19, wherein the door skin is a door skin of a residential or commercial building.

* * * * *